(12) United States Patent
Taylor et al.

(10) Patent No.: US 6,646,091 B2
(45) Date of Patent: Nov. 11, 2003

(54) ISOCYANATE CROSSLINKED WATERBORNE COATINGS

(75) Inventors: James W. Taylor, Gurnee, IL (US); Susan L. Renner, Racine, WI (US)

(73) Assignee: Johnson Polymer, Inc., Sturtevant, WI (US)

(*) Notice: Subject to any disclaimer, the term of this patent is extended or adjusted under 35 U.S.C. 154(b) by 0 days.

(21) Appl. No.: 10/073,791

(22) Filed: Feb. 11, 2002

(65) Prior Publication Data

US 2002/0151651 A1 Oct. 17, 2002

Related U.S. Application Data

(60) Provisional application No. 60/268,321, filed on Feb. 13, 2001.

(51) Int. Cl.[7] ............................................... C08G 18/62
(52) U.S. Cl. .................... 528/71; 525/123; 525/131; 528/75; 524/839; 524/840; 428/423.1; 428/425.8
(58) Field of Search ................... 525/123, 131; 528/75, 71; 524/839, 840; 428/423.1, 425.8

(56) References Cited

U.S. PATENT DOCUMENTS

| | | | |
|---|---|---|---|
| 4,814,514 A | 3/1989 | Yokota et al. | 568/608 |
| 5,332,854 A | 7/1994 | Yokota et al. | 558/33 |
| 5,539,073 A | 7/1996 | Taylor et al. | 526/323 |
| 5,548,019 A * | 8/1996 | Kawakami et al. | |
| 5,721,313 A | 2/1998 | Yeung et al. | |
| 5,783,626 A | 7/1998 | Taylor et al. | 524/555 |
| 5,891,950 A | 4/1999 | Collins et al. | 524/502 |
| 5,973,073 A * | 10/1999 | Guo et al. | |
| 6,028,155 A | 2/2000 | Collins et al. | 526/270 |
| 6,060,556 A | 5/2000 | Collins et al. | 524/533 |

FOREIGN PATENT DOCUMENTS

EP   0 244 841 A   11/1987

OTHER PUBLICATIONS

Barsa et al., "New Tools for Formulating Ultralow VOC, High–Performance 2K Polyurethane Coatings", Paint & Coatings Industry, May 2001, pp. 83–92.

Nabuus et al, "Defect Free Coatings from Two–Pack Isocyanate Curable Acrylic Dispersions", European Coatings Conference, pp. 4–23, 2001; Jan.

Feng et al, "New High Performance Two–Component Wood Coatings Comprised of a Hydroxy, Functional Acrylic Emulsion and a Water–Dispersible Polyisocyanate", *Journal of Coatings Technology*, vol. 71, No. 899, pp. 51–57, Dec., 1999.

Boudreaux et al, "Waterborne 2K Acrylic Polyurethanes: Novel Low—NCO/–OH Systems[1]", Presented at the *Waterborne, Higher–Solids, and Powder Coatings Symposium*, 12 pages, Feb. 18–20, 1998.

Flori et al, "Effect of Particle Size Distribution on the Performance of Two–Component Water–Reducible Acrylic Polyurethane Coatings Using Tertiary Polyisocyanate Crosslinkers", *Journal of Coatings Technology*, vol. 72, No. 902, pp. 63–65, 68–69, Mar. 2000.

Nagai: "Radial Polymerization and Potential Applications of Surface Active Monomers": Trends in Polymer Science, vol. 4, No. 4, Apr. 1966, pp. 122–127, XP004049247 Amsterdam, NL.

* cited by examiner

*Primary Examiner*—Rachel Gorr
(74) *Attorney, Agent, or Firm*—Renee J. Rymarz; Warren R. Bovee; Neil E. Hamilton

(57) ABSTRACT

Coating compositions include polymeric particles, an isocyanate-containing crosslinking agent, and water. The polymeric particles include at least one incorporated monoalkenyl aromatic monomer, at least one incorporated vinyl-containing surfactant macromonomer, and at least one incorporated acrylic monomer. At least one incorporated acrylic monomer in the polymeric particles includes a hydroxyl, amine, or a carboxylic acid functional group. The crosslinking agent is an isocyanate-containing organic compound or such a compound with blocked isocyanate groups. Coating compositions may be deposited and cured by heating to form crosslinked coating compositions. Such crosslinked coating compositions exhibit excellent solvent resistance.

6 Claims, No Drawings

ISOCYANATE CROSSLINKED WATERBORNE COATINGS

CROSS-REFERENCE TO RELATED APPLICATIONS

This application claims priority of U.S. Provisional Patent Application No. 60/268,321, filed Feb. 13, 2001.

STATEMENT REGARDING FEDERALLY SPONSORED RESEARCH OR DEVELOPMENT

None

FIELD OF THE INVENTION

The present invention relates to coating compositions, crosslinked coating compositions, coated substrates, and methods for producing the coating compositions and coated substrates. More particularly, the invention relates to coating compositions including polymeric particles and crosslinking agents comprising an organic compound having an isocyanate group or a blocked isocyanate group where the polymeric particles incorporate a monoalkenyl aromatic monomer, a vinyl-containing surfactant macromonomer, and at least one acrylic monomer having a hydroxyl, amine or carboxylic acid functional group.

BACKGROUND OF THE INVENTION

Waterborne coatings are used to protect surfaces on numerous objects important to everyday life. For example, such coatings are commonly used to protect metals, wood, concrete, paper, and other important materials used in the construction of objects as diverse as homes, automobiles, bridges, retaining walls, and tin and aluminum cans.

Many surfaces such as metals are prone to oxidation, especially when exposed to salts, acids, bases, and other corrosive chemicals. Because waterborne coatings are used in a wide variety of applications and cover a wide variety of surface types, coatings that exhibit resistance to organic solvents, water, acids, salts, and other corrosive materials are highly desirable.

Although various waterborne coating compositions have been developed which show some degree of resistance to solvents and other chemicals, such coatings generally have a high cure temperature.

U.S. Pat. No. 4,814,514 and U.S. Pat. No. 4,939,283 issued to Yokota et al. disclose certain surface-active compounds which have a polymerizable allyl or methallyl group. The surface-active compounds are disclosed as being particularly useful as emulsifiers in the emulsion or suspension polymerization of various monomers such that aqueous suspensions of the polymer particles are produced.

U.S. Pat. No. 5,332,854 and U.S. Pat. No. 5,324,862 issued to Yokota et al. disclose anionic and nonionic vinyl-aromatic surfactants capable of reacting with other monomers, and thus being incorporated into polymers, during polymerization reactions.

Various vinyl aromatic surfactants referred to as Noigen RN, a nonionic surfactant, and Hitenol™ BC, an anionic surfactant, are described in a technical bulletin published by DKS International, Inc. of Tokyo, Japan. Related polymerizable anionic surfactants referred to as Hitenol™ A-10 are similarly described in another technical bulletin published by the same entity. Both publications disclose the preparation of polymers containing the surfactants.

U.S. Pat. No. 5,891,950 issued to Collins et al. disclose the preparation of water-based ink compositions containing a pigment and a polymer latex. The disclosed latex is either a non-carboxylic acid containing polymeric (polyamino) enamine latex or a mixture of a polymeric (polyamino) enamine latex and an acetoacetoxy-functional polymer latex. The polymeric (polyamino) enamine for use in the ink is disclosed as a reaction product of a surfactant-stabilized acetoacetoxy-functional polymer that may be prepared from a vinyl-containing anionic or nonionic reactive surfactant such as Hitenol™ RN, Hitenol™ HS-20, Hitenol™ A-10, and Noigen RN.

U.S. Pat. Nos. 6,060,556 and 5,998,543 issued to Collins et al. disclose the composition, preparation, and end-use of waterborne compositions prepared from water-based latexes. The water-based latexes comprise dispersed, non-carboxylic acid containing waterborne polymeric amino-functional and acetoacetoxy-functional particles. The disclosed latex can be used in a variety of coating compositions such as paints, inks, sealants, and adhesives. Preparation of a surfactant-containing acetoacetoxy-functional polymer is disclosed which may be prepared using a vinyl-containing anionic or nonionic reactive surfactant such as Hitenol™ RN, Hitenol™ HS-20, Hitenol™ A-10, and Noigen RN.

U.S. Pat. No. 6,028,155 issued to Collins et al. disclose the preparation and composition of surfactant-containing acetoacetoxy-functional polymers. The acetoacetoxy-functional polymers may be a surfactant-containing enamine-functional polymer, but is more preferably a surfactant-containing polymeric (polyamino) enamine. The disclosed non-carboxylic acid containing waterborne polymer compositions can be prepared with a high solids content while maintaining low viscosity, and the compositions are disclosed as useful in a variety of coating applications such as in paints, inks, sealants, and adhesives.

U.S. Pat. No. 5,539,073 issued to Taylor et al. discloses polymers useful in coating compositions. The polymers are prepared via free radical polymerization using ethylenically unsaturated monomers.

Various reactive anionic and nonionic surfactants are disclosed as suitable surfactants for use in the disclosed emulsion polymerization process.

U.S. Pat. No. 5,783,626 issued to Taylor et al. discloses allyl-functional polymers having pendant enamine moieties and preferably also possessing pendant methacrylate groups. The patent also discloses that amino-containing waterborne particles can be prepared by reacting propylene imine with carboxylic acid-containing latexes. Such amino-functionalized latexes were reacted with acetoacetoxyethyl methacrylate. Vinyl-containing anionic and ionic surfactants are disclosed as components which can be added to processes used for preparing the acetoacetoxy-containing polymers.

Although a number of references have disclosed polymerizable surfactants and polymers incorporating such surfactants, none of the references discloses a coating composition that comprises a crosslinking agent and a polymeric particle prepared from a vinyl-containing surfactant macromonomer that exhibits enhanced solvent resistance when crosslinked at low cure temperatures or such a coating composition which cures at faster line speeds at higher temperatures.

It would be highly desirable to have a coating composition that exhibits increased solvent resistance, chemical resistance, and hardness development at ambient cure temperatures.

SUMMARY OF THE INVENTION

The invention provides coating compositions that include polymeric particles, a crosslinking agent, and water. The polymeric particles include at least one incorporated monoalkenyl aromatic monomer, at least one incorporated vinyl-containing surfactant macromonomer, and at least one incorporated acrylic monomer. At least one incorporated acrylic monomer includes a hydroxyl functional group, or a carboxylic acid functional group. The crosslinking agent is an organic compound having at least one isocyanate group, at least one blocked isocyanate group, or at least one isocyanate group and at least one blocked isocyanate group. In one embodiment, coating compositions are provided in which the crosslinking agent is a polyisocyanate. In other coating compositions, the polymeric particles incorporate at least one acrylic monomer with a hydroxyl group and at least one acrylic monomer with a carboxylic acid functional group.

A method of preparing a coating composition includes mixing polymeric particles with a crosslinking agent to produce the coating composition. The polymeric particles include at least one incorporated monoalkenyl aromatic monomer, at least one incorporated vinyl-containing surfactant macromonomer, and at least one incorporated acrylic monomer.

At least one incorporated acrylic monomer of the polymeric particles includes a hydroxyl functional group, an amine functional group, or a carboxylic acid functional group. The crosslinking agent is an organic compound having at least one isocyanate group, at least one blocked isocyanate group, or at least one isocyanate group and one blocked isocyanate group. Preferred methods include a polyisocyanate crosslinking agent.

The invention also provides a method for preparing a coated substrate that includes coating a substrate with a coating composition according to the present invention.

The invention further provides coated substrates that include a substrate, preferably metal, coated with a coating composition according to the present invention. Coated substrates are also provided that include a substrate coated with a crosslinked coating composition according to the present invention.

Still further features and advantages of the invention will be apparent upon examination of the following detailed description.

DETAILED DESCRIPTION OF THE INVENTION

A polymeric particle "substantially free" of an item is a polymeric particle that contains less than 2%, more preferably less than 1%, and most preferably less than 0.25% (w/w) of the item.

A coating composition "substantially free" of an item is a coating composition that contains less than 0.5% (w/w) of the item.

A polymeric particle that has a monomer "incorporated" into it means that the monomer has reacted in a polymerization reaction and that the reacted monomer is chemically attached to the polymeric particle.

A coating composition with a polymeric particle incorporating a vinyl-containing surfactant macromonomer "exhibits enhanced solvent resistance" when the solvent resistance of the cured coating as judged by integrity and appearance after exposure to solvent is greater than that of a cured coating composition prepared under identical conditions except that the polymeric particle does not incorporate a vinyl-containing surfactant macromonomer, but rather where the coating composition includes the surfactant sodium dioctyl sulfosuccinate.

All ranges recited herein include all combinations and subcombinations included within that range's limits. Therefore, a range from "5–90%" includes ranges from "5–72%", "12–65%", etc. A range of "greater than 100° C." would include "greater than 112° C.", "greater than 150° C.", etc.

Generally, coating compositions according to the invention include a polymeric particle, a crosslinking agent, and water. Typically, the polymeric particles are prepared by an emulsion polymerization so that the polymeric particles are obtained as an aqueous dispersion. The polymeric particles of the coating composition include at least one incorporated monoalkenyl aromatic monomer, at least one incorporated vinyl-containing surfactant macromonomer, and at least one incorporated acrylic monomer. At least one incorporated acrylic monomer of the polymeric particle includes a hydroxyl functional group, an amine functional group, or a carboxylic acid functional group. The crosslinking agent is an organic compound having at least one isocyanate group, at least one blocked isocyanate group, or at least one isocyanate group and at least one blocked isocyanate group. Preferable crosslinking agents are polyisocyanates or compounds, polymeric or otherwise, with more than two isocyanate groups.

The polymeric particle for use in the method of the present invention incorporates at least one vinyl-containing surfactant macromonomer. The vinyl-containing surfactant macromonomer is preferably a vinyl aromatic surfactant macromonomer and more preferably is a vinyl aromatic anionic or nonionic surfactant macromonomer. Preferred vinyl-containing surfactant macromonomers for use in the present invention have the structure:

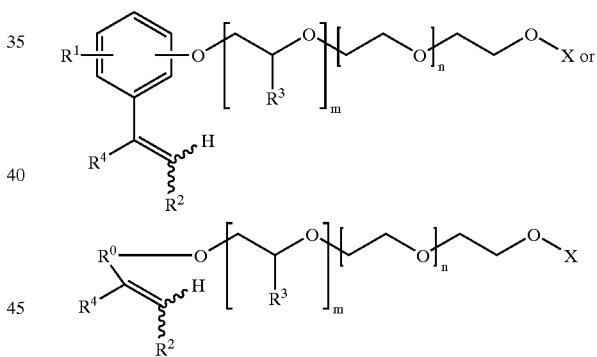

where: $R^0$ is an organic di-radical, $R^1$ is H, a halogen, or a $C_1$ to $C_{22}$ linear or branched chain hydrocarbon group; $R^2$ is H, a halogen, or a linear or branched chain $C_1$ to $C_6$ linear or branched chain hydrocarbon and the zigzag lines represent that the $R_2$ group can be either cis or trans to the aromatic group; $R^3$ is H, a halogen, or a $C_1$ to $C_6$ linear or branched chain hydrocarbon group; $R^4$ is H or a $C_1$ to $C_4$ alkyl group; m is an integer ranging from 0 to 20; n is an integer ranging from 1 to 50; X is H, $SO_3^-Y$, $P(=O)(OH)_2$, or a deprotonated form of $P(=O)(OH)_2$; and Y is a cation such as sodium, lithium, potassium, ammonium, monoalkylammonium, dialkylammonium, trialkylammonium, or tetralkylammonium. More preferred vinyl-containing surfactant macromonomers for use in the present invention include those where m is 0 or 1; n is an integer from 5 to 25, more preferably 14 to 25; $R^2$ is a methyl or H; $R^3$ is H; $R^4$ is H; and X is $SO_3^-Y$. In still more preferred vinyl-containing surfactant macromonomers n is 19, m is 0, and Y is an ammonium, a monoalkylammonium, a dialkylammonium, a trialkylammonium, or a tetraalkylammonium cation. In still other preferred vinyl-containing surfactant macromonomers, the vinyl-group of the vinyl-containing surfactant macromonomer is ortho to the alkoxy group bonded to the aromatic ring of the vinyl-containing surfactant macromonomer.

The polymeric particles in the coating compositions of the present invention incorporate at least one acrylic monomer and at least one monoalkenyl aromatic monomer in addition to incorporating at least one vinyl-containing surfactant macromonomer. At least one acrylic monomer incorporated in the polymeric particle preferably has a hydroxyl, amine, or carboxylic acid functional group. More preferred particles in the coating of the present invention incorporate at least one vinyl-containing surfactant macromonomer, at least two different acrylic monomers, and at least one monoalkenyl aromatic monomer. In especially preferred embodiments, the polymeric particles incorporate at least one acrylic monomer having a hydroxyl group such as, for example, hydroxyalkyl acrylates and hydroxyalkyl methacrylates.

Various acrylic monomers may be incorporated in the polymeric particle used in the present invention. Examples of acrylic monomers include, but are not limited to, acrylic acid, methacrylic acid, crotonic acid, esters of acrylic acid, esters of methacrylic acid, esters of crotonic acid, salts of acrylic acid, salts of methacrylic acid, and salts of crotonic acid. These are all examples of acrylic monomers including a carboxylic acid group.

Examples of acrylate and methacrylate monomers that may be incorporated in the polymeric particle include, but are not limited to, methyl, ethyl, n-propyl, i-propyl, n-butyl, s-butyl, i-butyl, t-butyl, n-amyl, i-amyl, n-hexyl, 2-ethylbutyl, 2-ethylhexyl, n-heptyl, n-octyl, n-nonyl, n-decyl, cyclopentyl, cyclohexyl, benzyl, phenyl, cinnamyl, 2-phenylethyl, allyl, methallyl, propargyl, crotyl, 2-hydroxyethyl, 2-hydroxypropyl, 2-hydroxybutyl, 6-hydroxyhexyl, 5,6-dihydroxyhexyl, 2-methoxybutyl, 3-methoxybutyl, 2-ethoxyethyl, 2-butoxyethyl, 2-phenoxyethyl, glycidyl, furfuryl, tetrahydrofurfuryl, tetrahydropyryl, N,N-dimethylaminoethyl, N,N-diethylaminoethyl, N-butylaminoethyl, 2-chloroethyl, 3-chloro-2-hydroxypropyl, trifluoroethyl, and hexafluoroisopropyl acrylates and methacrylates. More preferred acrylates and methacrylates include alkyl acrylates and methacrylates such as the various isomers of methyl, ethyl, propyl, butyl, pentyl, hexyl, heptyl, octyl, n-nonyl, and n-decyl acrylates and methacrylates. Other preferred acrylates and methacrylates include hydroxyalkyl acrylates and methacrylates such as, but not limited to 2-hydroxyethyl and 3-hydroxypropyl acrylate and methacrylate. Particularly preferred acrylic monomers for incorporation into the polymeric particles of the coating compositions according to the invention include 2-hydroxyethyl acrylate, 2-hydroxyethyl methacrylate, 2-ethylhexyl acrylate, and methacrylic acid.

Although, as described above, a large number of different acrylic monomers may be incorporated into the polymeric particles, a particularly useful combination of acrylic monomers for incorporation into a polymeric particle include 2-ethylhexyl acrylate, 2-hydroxyethyl acrylate, and methacrylic acid. These are especially preferred when combined with monomers such as styrene, α-methylstyrene, or both. When used to prepare the polymeric particles, the following monomers are used in the following amounts where the ranges in parentheses respectively indicate the preferred range, the more preferred range, and the most preferred range of the monomer used by weight based on the total weight of the monomers: styrene (5–90%; 20–70%; 40–60%); methyl methacrylate (5–90%; 20–70%; 40–60%); 2-ethylhexyl acrylate (5–90%; 20–70%; 22–33%); ethyl acrylate (5–90%; 20–60%, 30–50%); hydroxyethyl acrylate (3–30%; 6–20%; 8–16%); hydroxyethyl methacrylate (3–30%; 6–20%; 8–16%); methacrylic acid (0–20%; 6–20%; 0–5%); vinyl-containing surfactant macromonomer (0–10%; 0.5–5%; 1–2%); octyl mercaptopropionate (0–5%; 0–1%; 0–0.1%); and butyl acrylate (5–90%; 20–70%; 25–45%). Polymer particles incorporating amine functional groups can be prepared by techniques known in the art for example such as those disclosed in the U.S. Pat. No. 5,998,543 issued to Collin and Taylor.

A variety of monoalkenyl aromatic monomers may be incorporated in the polymeric particle for use in the present invention. For example, suitable monoalkenyl aromatic monomers include, but are not limited to styrene, vinyltoluene, α-methyl styrene, t-butyl styrene, vinylxylene, and vinylpyridine. More preferred monoalkenyl aromatic monomers include styrene and α-methyl styrene. Although some of the vinyl-containing surfactant macromonomers incorporated in the polymeric particle are aromatic vinyl-containing surfactant macromonomers and could thus be classified as a type of monoalkenyl aromatic monomer, the term "monoalkenyl aromatic monomer" as used herein is defined to not include the vinyl-containing surfactant macromonomers.

A variety of other monomers may be incorporated in the polymeric particle for use in the present invention. One such monomer that may be incorporated in the polymer includes vinyl ester monomers. Preferred vinyl esters include, but are not limited to, those having the structure $H_2C=C(R^5)-O-C(=O)-R^6$ where $R^5$ is either H or an alkyl group having from 1 to 5 carbon atoms and $R^6$ is an alkyl group having from 1 to 22 carbon atoms. In a more preferred embodiment, at least one of the carbon atoms of the $R^6$ alkyl group is bonded to at least three other carbon atoms. Thus, more preferred vinyl ester monomers include those with a tertiary or quaternary carbon in the $R^6$ alkyl group. Examples of a few of these more preferred vinyl ester monomers include, but are not limited to: $H_2C=C(R^5)-O-C(=O)-C(CH_3)_3$, $H_2C=C(R^5)-O-C(=O)-CH_2-(CH_3)_3$, $H_2C=C(R^5)-O-C(=O)-CH(CH_3)-CH_2-CH_3$, $H_2C=C(R^5)-O-C(=O)-CH_2-C(CH_3)_2CH_2-CH_2-CH_2-CH_3$, and $H_2C=C(R^5)-C(=O)-C(CH_3)_2-CH_2-CH_3$.

It is not necessary or required that the polymeric particle for use in the coating compositions contain metal chelating groups such as acetoacetoxy, amine, or enamine groups. Rather, it has been found that metal surfaces coated with coating compositions including a crosslinking agent and polymeric particles that do not contain these groups exhibit enhanced resistance to organic solvents even when cured at ambient temperature. However, these groups may be present if so desired. The fact that these groups can be excluded from the polymeric particles for use in the present invention helps to reduce the costs associated with using monomers such as acetoacetoxyethyl methacrylate. Furthermore, because the polymeric particles do not require any polymeric amine or enamine, acid-functional acrylic monomers such as, but not limited to, acrylic acid, methacrylic acid, and crotonic acid may be incorporated without any resulting cloudiness or flocculation. The polymeric particle need also not contain trimethylolpropane triacrylate as coating compositions containing polymers prepared without this material have shown excellent solvent resistance on surfaces.

The coating compositions of the present invention include a crosslinking agent. The crosslinking agent(s) is an organic compound having at least one isocyanate group, at least one blocked isocyanate group, or at least one isocyanate group and at least one blocked isocyanate group. Preferred crosslinking agents of the present invention are polyisocyanates meaning that they have two or more isocyanate groups per molecule. Preferred crosslinking agents include polyisocyanates with two, three, four, or more isocyanate groups per molecule. Crosslinking agents of the invention may be polymeric compounds or small molecules.

The phrase "blocked isocyanate group" refers to a functional group that breaks down to form an isocyanate group and a blocking compound. Any blocked isocyanate group known to those skilled in the art may be employed in the present invention. Examples of blocking compounds that may be used to prepare blocked isocyanates include, but are not limited to, phenols; alcohols; oximes such as, but not limited to, those prepared from methyl ethyl ketone, acetone, and diisopropyl ketone; ε-caprolactam, and diethyl malonate. Upon heating, blocked isocyanate groups are unblocked to produce reactive isocyanate groups that will react with hydroxyl functionalities on the polymeric particles to produce polyurethane crosslinked coatings that exhibit enhanced resistance to water, organic solvents, acid solutions, and other chemicals. Particularly preferred crosslinking agents include unblocked isocyanates such as Bayhydur® XP 7063 (Bayer, Germany) and Tolonate® WT 2102 brand of polyisocyanate available from Rhodia (Cranbury, N.J.), and blocked isocyantates such as Bayhydur® BL 116 brand of polyisocyanate available from Bayer (Germany) and Tolonate® WT 1000 brand of polyisocyanate available from Rhodia (Cranbury, N.J.).

One group of preferred isocyanates includes hydrophilic isocyanates such as, but not limited to, trimers of simpler isocyanates or polyisocyanates with one or more isocyanate group reacted with a surfactant to improve incorporation and hydrophilic character. Other preferred isocyanates include hydrophobic isocyanates that are emulsified to improve incorporation.

Polymeric particles containing carboxylic acid functional groups will also react with the crosslinking agent so the polymeric particles may incorporate an acrylic monomer containing this functionality in place of or in addition to the acrylic monomers with the hydroxyl functional group. However, polymeric particles incorporating acrylic monomers with hydroxyl functional groups or incorporating at least one acrylic monomer with a hydroxyl functional group and at least one acrylic monomer with a carboxylic acid functional group are especially preferred.

The polymeric particle for use in the present invention may be prepared using any method known to those skilled in the art for incorporating radically-polymerizable ethylenically-unsaturated monomers into a polymer. The polymer may be prepared by continuous, semi-batch or batch processes using any type of reactor known to those skilled in the art. Various polymerization processes are disclosed in U.S. Pat. No. 4,414,370, U.S. Pat. No. 4,529,787, and U.S. Pat. No. 4,546,160 and these patents are herein expressly incorporated by reference in their entirety.

The polymeric particle may also be prepared by emulsion polymerization techniques and methods known to those skilled in the art. For example, a suitable latex containing incorporated vinyl-containing surfactant macromonomer may be prepared by adding a standard initiator such as, but not limited to, ammonium persulfate to an aqueous heated solution of a vinyl-containing surfactant macromonomer such as Hitenol™ BC-20 available from DKS International, Inc. (Tokyo, Japan) while it is stirred in a resin kettle. A monomer feed containing additional monomers may then be added to the resulting mixture. For example, an emulsion feed containing more of the vinyl-containing surfactant macromonomer; acrylic monomers such as a mixture of methacrylic acid, 2-hydroxyethyl acrylate and 2-ethylhexyl acrylate; and an monoalkenyl aromatic monomer such as styrene or a mixture of monoalkenyl aromatic monomers, may be added to the solution.

The monomer feed may contain additional components such as, but not limited to, solvents and chain transfer agents. For example, any conventional chain transfer agent such as octyl mercaptopropionate may be present in the monomer feed. Once monomer addition is complete, oxidants such as ferrous sulfate may be added to the mixture followed by addition of initiators such as t-butyl hydroperoxide dissolved in aqueous solution containing isoascorbic acid and ammonium hydroxide. The pH of the aqueous product is generally increased to value of greater than about 8 by addition of ammonium hydroxide solution. Preferred coating compositions prepared from aqueous dispersion containing the polymeric particles generally have a pH of greater than 7 and less than about 10. More preferably, the pH of the coating composition is greater than 8 or about 8.

The coating compositions may be prepared by mixing polymeric particles according to the invention with a crosslinking agent according to the invention. Curing agents may also be added to the coating compositions. The ratio of polymeric particles to crosslinking agent by weight preferably ranges from about 95:5 to about 65:35, more preferably ranges from about 92:8 to about 70:30, still more preferably from about 90:10 to about 80:20. In one embodiment, coating compositions are obtained using a ratio of polymeric particles to polyisocyanate-based crosslinking agent of about 80:20 and about 90:10 by weight. Generally, the ratio of isocyanate groups in the crosslinking agent to hydroxyl groups in the polymeric particle will range from 1:1 to 2:1 or more preferably will be about 1.5:1.

Because the rate at which unblocked isocyanate crosslinking agents unblock to produce reactive isocyanate varies depending on the reactivity and steric factors associated with the blocking group and the isocyanate group, curing temperatures should be adjusted based upon the particular type of isocyanate groups (e.g. aliphatic or aromatic) and blocking group.

Preferably, polymeric particles are mixed with the crosslinking agent at about room temperature or a temperature ranging from about 21° C. to about 25° C. when using unblocked isocyanates. The temperatures will vary depending on the particular blocking agent used when blocked isocyanates are utilized. Generally, the isocyanate(s) is cut to the desired percent of solids by dilution with a solvent which mixture is then added under agitation to the polymeric particles.

Mixing of the polymeric particles with the crosslinking agent and optionally, but preferably, additional components may be accomplished using any well known agitation method known to those skilled in the art. Thus, the mixing may be accomplished with a blender or any other high speed mixing device. Generally, introduction of the crosslinking agent involves preblending the crosslinking agent with a water miscible solvent that may include water. The blend containing the crosslinking agent is typically added to the polymer particles while agitated using any high speed mixing apparatus as described above. Blade speeds of 50 revolutions per minute or higher are generally preferred. Pigments such as $TiO_2$ may be used to produce white compositions. Similarly, other pigments or combinations of pigments known to those skilled in the art may be added to produce a desired color for the formulation. Furthermore, pigments may be excluded from the formulations of the present invention to produce colorless transparent coatings.

A coated substrate may be prepared by coating a substrate with a coating composition according to the present invention. The coating may then be allowed to dry at room temperature or may be dried at elevated temperature. A coated substrate having a crosslinked coating composition is typically prepared by heating (curing) the coated substrate to a temperature of greater than about 90° C., preferably at a temperature between 90° C. and 180° C., and also preferably to a temperature of greater than about 180° C. As noted above, however, the curing temperature should be varied to suit the crosslinking agent included in the formulation. It has been discovered that the temperature plays an important role in determining the solvent and chemical resistance of a coating on a substrate. Additionally, curing catalysts may be added to lower the curing temperature while still obtaining the same solvent resistance afforded at higher cure temperatures. Additionally, any suitable alternative method of curing well known in the art, such as ultraviolet light, may be utilized in addition to or in place of thermal curing.

Various substrates may be coated with the coating compositions of the invention. A preferred coated substrate is a metal such as, but not limited to, aluminum, copper, tin, steel, or iron coated with a coating composition according to the present invention. Other substrates that may be coated include plastic and paper surfaces. Particularly preferred coated substrates are coated aluminum and steel. The substrate can take various forms.

The coating composition may be applied to a metal or any other surface using any technique known to those skilled in the art. Thus, the polymeric particle may be applied to a metal surface as a clear coat formulation. Alternatively, the polymeric particle may be applied as one of several components in a paint. Such paints can be readily prepared by mixing a latex prepared as described above with a number of ingredients using conventional techniques. For example, the latex may be mixed with water, a conventional pigment such as, but not limited to, TiPure™ R-706 $TiO_2$ pigment or TiPure™ R-900 $TiO_2$ pigment, both available from E.I. DuPont de Nemours (Wilmington, Del.) and various conventional additives such as, but not limited to, organic solvents, defoamers, conventional surfactants, associative thickeners, plasticizers, flash rust inhibitors, and dispersants. Non-limiting representative examples of some of these components are CT-324 dispersant available from Air Products (Allentown, Pa.); Surfynol® CT-151 dispersant available from Rohm and Haas Company (Philadelphia, Pa.); Surfynol® 104DPM conventional surfactant available from Rohm and Haas Company (Philadelphia, Pa.); BYK 020 defoamer available from BYK Chemie (Wallingford, Conn.); Dehydran® 1620 defoamer available from Henkel Corp. (Ambler, Pa.); ®PUR 40 an associative thickener available from King Industries, Inc. (Norwalk, Conn.); DSX®-1550 associative thickener available from Henkel Corp. (Ambler, Pa.); RM-825™ associative thickener available from Rohm and Haas Company (Philadelphia, Pa.); KP-140® tributoxy ethyl phosphate available from FMC Corp. (Philadelphia, Pa.); and Raybo™ 60 flash rust inhibitor available from Raybo Chemical Company (Huntington, W.Va.). In addition, one skilled in the art will recognize that other types of polymeric particles may be included in the coating compositions of the present invention. For example, polymeric particles that do not incorporate acrylic monomers with hydroxyl functional groups, amine functional groups, or carboxylic acid functional groups may be mixed with polymeric particles that do incorporate such acrylic monomers to produce coating compositions that include two or more types of polymeric particles.

Surprisingly and unexpectedly, it has been found that coating compositions comprising a polymeric particle incorporating vinyl-containing surfactant macromonomer(s) and a crosslinking agent show drastically improved solvent resistance and resistance to aqueous acid solutions compared to similar coating compositions that contain polymers without incorporated vinyl-containing surfactant macromonomers, but rather contain conventional surfactants. It has been found that the solvent resistance for the coating compositions that contain crosslinking agents such as the preferred crosslinking agents of the invention may be better than those with a conventional surfactant, but without the incorporated vinyl-containing macromonomer, even when the cure temperature of the coating is lower for the compositions prepared from the vinyl-containing surfactant macromonomer.

The coating compositions may be applied to a substrate using any technique known to those skilled in the art including, but not limited to, spray coating, brush coating, powder coating, and application with applicator blades.

The coating compositions applied to substrates are generally in an aqueous polymeric dispersion such as, but not limited to, a latex.

However, the polymeric particles and crosslinking agents may also be dissolved in an organic solvent and thus applied to the surface. Thus, the coating composition of the invention may be painted on a substrate surface using any of various techniques known to those skilled in the art. Additionally, the coating composition may be applied in other forms including, but not limited to, as a powder coating. A solution containing the polymeric particles for application to the substrate may contain various other ingredients as described above and demonstrated below.

The coating compositions of the present invention may be formulated as clear coats, as paints, as inks, as coating for textiles, and as coatings for wood.

The invention is further described in the following non-limiting examples.

EXAMPLES

Example 1

Preparation of a Latex Using Vinyl-Containing Surfactant Macromonomer

To a 3000 mL resin kettle equipped with a nitrogen purge, three-blade impeller, and condenser were charged 521 g of water and 11.5 g of a 10% solution of Hitenol™ BC-20 a brand of vinyl-containing reactive surfactant macromonomer available from DKS International, Inc. (Tokyo, Japan). The surfactant solution was heated to 80° C. with stirring, then 3.2 g of ammonium persulfate dissolved in 40 g of water was pumped into the reactor over 5 minutes followed by addition of 7.5 g of water. An emulsion feed of 280 g of water, 6.65 g of Hitenol™ BC-20 (100%), 83.04 g of 2-hydroxyethyl acrylate, 346.0 g of styrene, 193.41 g of 2-ethylhexyl acrylate, 0.050 g of octyl mercaptopropionate, and 13.92 g of methacrylic acid was pumped into the reactor over 220 minutes. After the monomer emulsion addition was complete, an additional 7.5 g of water was pumped into the reactor. The water addition was followed by the addition of 1.0 g of ferrous sulfate solution (ferrous sulfate complexed with ethylenediaminetetraacetic acid (EDTA)). A solution of 1.7 g of t-butyl hydroperoxide dissolved in 20.0 g of water and a solution of 1.26 g of isoascorbic acid dissolved in 2.0 g of 28% ammonium hydroxide and 18.0 g of water were then pumped into the latex over 15 minutes. The latex was heated for an additional 20 minutes, and 28% ammonium hydroxide was then added to raise the pH to a value greater than 8. The resulting latex was filtered through a 100-mesh wire screen. The following data was recorded for the latex: dried solids collected through the 100-mesh screen (0.21g); percent solids in latex (43.4%); pH of latex (8.9); Mn (20,610); Mw (290,100); particle size (141 nm (Dn)); Tg (51° C.); and minimum film formation temperature (32.2° C.).

Examples 2–5

Preparation of Coating Compositions From the Latex Prepared in Example 1

White-pigmented paint formulation were prepared using the latex prepared in Example 1 as a binder. The formulations were prepared by producing a dispersion of water; CT-324, a brand of surfactant available from Air Products (Allentown, Pa.); BYK 020, a brand of defoaming agent available from BYK Chemie (Wallingford, Conn.); and $TiO_2$ pigment. The CT-324 and BYK 020 were first added to the water under moderate agitation (approximately 50–100 rpm). The pigment was then added at about 100 rpm until it was fully incorporated such that there was no dry pigment on the surface of the mixture. Next, the mixture was dispersed using a Cowles blade to a value of 7.0 Hegman. Hegman is a unitless scale used to measure the fineness of a pigment dispersion. The Hegman grind gauge is a square metal bar with a well that gets progressively deeper on moving from the top to the bottom. A sample of paint was drawn along the well. Particles are deposited at a particular well depth depending on the size of the particle. The Hegman scale denotes the distance from the beginning of the well (the shallow end) to the end of the well (the deepest end). A reading of 7.0 Hegman means that the size of the dispersed pigment particles are about 15 $\mu$. After dispersion, the other components were added to the resulting mixture with vigorous stirring. First, the latex of Example 1 and the Surfynol® 104DPM brand wetting agent available from Air Products (Allentown, Pa.) were mixed and added to the grind under agitation. Next, the Acrysol® RM 825 brand thickener available from Rohm and Haas (Philadelphia, Pa.) and the Dowanol® DPM and Dowanol® DPnB brands of coalescent solvent available from The Dow Chemical Company (Midland, Mo.) were mixed with water and added under agitation. The Raybo™ 60 brand rust inhibitor available from Raybo Chemical Company (Huntington, W.Va.) and the Fluorad® FC-120 brand levelling agent available from 3M (Minneapolis, Minn.) were then added to the formulation, and the resulting mixture was stirred for fifteen minutes. Finally, the isocyanates shown in Table 1 were added to the composition in the amounts shown. The isocyanates were cut to 75% solids and were added before spraying. The isocyanates were added under good agitation over a period of approximately 5 min. Table 1 provides a list of the quantity of each of the ingredients in the coating compositions prepared using the Latex of Example 1.

TABLE 1

Paint Formulations Prepared Using the Latex of Example 1.

| Components Added to Formulation | Example (Weight %) | | | |
|---|---|---|---|---|
| | 2 | 3 | 4 | 5 |
| Latex of Example 1 | 42.2 | 42.2 | 42.2 | 42.2 |
| CT-324[a] | 0.57 | 0.57 | 0.57 | 0.57 |
| BYK 020[b] | 0.08 | 0.08 | 0.08 | 0.08 |
| Deionized Water | 27.23 | 33.22 | 27.23 | 31.51 |
| $TiO_2$ | 11.0 | 11.0 | 11.0 | 11.0 |
| Surfynol ® 104 DPM[c] | 1.45 | 1.45 | 1.45 | 1.45 |
| Acrysol ® RM 825[d] | 0.24 | 0.24 | 0.24 | 0.24 |
| Dowanol ® DPM[e] | 2.36 | 2.36 | 2.36 | 2.36 |
| Dowanol ® DPnB[f] | 2.36 | 2.36 | 2.36 | 2.36 |
| Fluorad ® FC-120[g] | 0.04 | 0.04 | 0.04 | 0.04 |
| Raybo ™ 60[h] | 0.49 | 0.49 | 0.49 | 0.49 |
| Bayhydur ® XP 7063[i] | 8.98 | 4.49 | — | — |
| Tolonate ® WT 2102[j] | — | — | 8.50 | — |
| Tolonate ® WT 1000[k] | — | — | — | 7.7 |
| Exxate ® 700[l] | 3.00 | 1.50 | 3.00 | — |
| Total | 100 | 100 | 100 | 100 |

[a] a brand of dispersant available from Air Products (Allentown, PA).
[b] a brand of defoaming agent available from CYK Chemie (Wallingford, CT).
[c] a brand of wetting agent available from Air Products (Allentown, PA).
[d] a brand of thickener available from Rohm and Haas Company (Philadelphia, PA).
[e] a brand of coalescent solvent available from The Dow Chemical Company (Midland, MI).
[f] a brand of coalescent solvent available from The Dow Chemical Company (Midland, MI).
[g] a brand of leveling agent available from 3M (Minneapolis, MN).
[h] a brand of rust inhibitor available from Raybo Chemical Company (Huntington, WV).
[i] a brand of polyisocyanate available from Bayer (Germany).
[j] a brand of polyisocyanate available from Rhodia (Cranbury, NJ).
[k] a brand of polyisocyanate available from Rhodia (Cranbury, NJ).
[l] a brand of alkyl acetate solvent available from ExxonMobil (Boston, MA).

The test results for the paint formulations of Examples 2–5 are summarized below in Table 2. Coatings were drawn over cold rolled steel (CRS) panels and allowed to cure for 7 days under ambient conditions. The Konig pendulum hardness (KPH) of cured coatings was measured according to ASTM D-4366 and pencil hardness was measured according to ASTM D-3363. Chemical resistance of cured coatings was tested by placing a 20 mm diameter filter paper on the coating, saturating the filter paper with chemical and covering with a watch-glass for 24 hours. The watch glass and filter paper were removed and coating was dried with a clean cloth. The coating was allowed to recover for 1 hour and then rated for integrity and appearance on a 1 to 5 scale with 1 being poor and 5 being the best.

TABLE 2

Test Results of Examples 2–5 Over CRS

| Example | 2 | 3 | 4 | 5 |
|---|---|---|---|---|
| KPH, 7 day | 60 | 24 | 34 | 154 |
| Pencil, 7 day | F | 4B | 2H | 4H |
| Chemical | | | | |
| HCl | 3.5 | 4 | 4 | 5 |
| NaOH | 4 | 4 | 4 | 5 |
| Gasoline | 4.5 | 4.5 | 4 | 4.5 |
| EtOH | 4 | 4 | 4 | 5 |
| Skydrol | 3.5 | 3 | 3.5 | 5 |

The compositions of Examples 2–4 may be dried under ambient conditions or baked in an oven at temperature up to about 165° C. The composition of Example 5, however, is preferably baked in an oven at temperatures of at least about 148° C.

The compositions of Examples 2–5 were compared to formulations prepared using a hydroxyl functional latex such as Roshield® brand hydroxyl functional latex obtained from Rohm and Haas (Philadelphia, Pa.) (Comparative Example 1). The composition of Example 2 was also tested and compared with a second comparative latex (Comparative Example 2) and Joncryl 500® brand solvent-borne high solids polyol system obtained from S. C. Johnson (Racine, Wis.). The composition prepared from Roshield® brand hydroxyl functional latex required baking at about 77° C. for one hour to achieve adequate curing. The formulation of Example 5 was baked for 45 minutes at 163° C. to cure the composition. The compositions had the properties shown in Table 3.

Comparative Example 1 was prepared as follows. All percentages are percent by weight. 54.42% Roshield® 3275 (a brand of hydroxyl functional acrylic emulsion available from Rohm and Haas Company) was added to 15.11% water and 0.46% dipropylene glycol monomethyl ether under agitation. Then 0.06% Byk 346 (a brand of flow aid available from CYK Chemie), 0.27% Tego Glide 410 (50% in DPM) (a brand of slip, mar aid available from Goldschmidt Chemical Corp.), 21.67% Aquasperse 877-0019 (a brand of color dispersant available from Huls America, Inc.), 0.98% Tego Foamex 805 (a brand of defoamer available from Goldschmidt Chemical Corp.), 0.48% Surfynol 104DPM (a brand of wetting aid available from Air Products & Chemicals, Inc.), and 1.55% Michem Emulsion 39235 (a brand of slip, mar aid available from Michelman, Inc.) were added. To this mixture was slowly added Bayhydur® XP-7063 (a brand of water reducible polyisocyanate available from Bayer Corp.) with mild agitation over a period of 5–10 min.

Comparative Example 2 was prepared as follows. All percentages are percent by weight. 0.645% sodium lauryl sulfate (30%) was added to 43.484% deionized water. To this was added 0.229% ammonium persulfate in 2.579% deionized water. To this was added over a 60 min. period a first monomer feed comprising 0.553% isooctyl mercaptopropionate, 1.225% hydroxypropyl methacrylate, 1.105% methacrylic acid, 1.516% cyclohexyl methacrylate, 4.548% methyl methacrylate, 1.297% alpha-methyl styrene, and 1.297% styrene. This was then flushed with 1.719% deionized water and neutralized with 0.161% ammonia (28% ammonia) in 2.579% deionized water over a 10 min. period. A second deionized water flush (1.719%) then followed. A second monomer feed was then added over a 90 min. period. This second monomer feed comprised 4.533% hydroxypropyl methacrylate, 3.470% alpha-methyl styrene, 3.470% styrene, 4.058% cyclohexyl methacrylate and 12.174 methyl methacrylate. This was flushed with deionized water (1.719%) and held for 60 min. The emulsion was neutralized with 2.042% T-amine in 2.579% deionized water. This was then flushed again with 0.860% deionized water and followed with an addition of a biocide (0.009% Kathon LX-14% brand biocide in 0.430% deionized water).

The Joncryl 500® brand paint formulation was prepared as follows. All percentages are percent by weight. 18.82% Joncryl 500® (a brand of high solids polyol system available from S. C. Johnson), 0.20% Byk 320 (a brand of flow and leveling agent available from Byk Chemie) and 3.76% MAK were mixed together. To this was added 30.96% Ti-Pure R-900 (a brand of pigment available from Dupont). Next, the mixture was dispersed using a Cowles blade to a value of 6–7 Hegman. To this was then added 18.78% Joncryl 500®, 10.78% MAK and 0.02% of 10% DBTDL in MAK. Prior to spraying, Desmodur N3200 (a brand of isocyanate available from Bayer Corp.) in MAK was added (14.4% Desmodur N3200 in 2.28% MAK).

TABLE 3

Properties of Cured Formulations Prepared from Example 5 and Roshield ® brand hydroxyl functional latex.

| Property | Example 2 | | Comparative Example 1 | | Comparative Example 2 | | Joncryl 500 ® |
| --- | --- | --- | --- | --- | --- | --- | --- |
| | CRS | B1000 | CRS | B1000 | CRS | B1000 | B1000 |
| Surface Koenig, 7-day | 60 | 71 | mid 40's | mid 40's | 39 | 47 | 106 |
| 7-day Pencil Hardness | F | 3H | 2B | 2B | NA | NA | H |
| Chemical Resistance | | | | | | | |
| HCl | 3.5 | 5.0 | 3.0 | 3.5 | 2.0 | 1 | 5.0 |
| NaOH | 4.0 | 5.0 | 2.5 | 4.5 | 2.5 | 1 | 5.0 |
| Gasoline | 4.5 | 4.5 | 2.5 | 3.0 | 2.5 | 2 | 5.0 |
| Ethanol | 4.0 | 5.0 | 2.5 | 4.0 | 2.5 | 2 | 5.0 |
| Skydrol | 3.5 | 4.5 | 4.0 | 4.0 | 2.0 | 3 | 5.0 |
| Gloss 20/60 | 56/87 | 55/86 | 40/77 | NA | — | — | 90/98 |
| Humidity 48 hour | 6d | None | 6d | 6/8d | 4d | 8d | None |

Paints prepared from the latexes according to the present invention exhibit improved cure response based on hardness development (Koenig and pencil) over comparative examples. Paints according to the present invention also exhibit improved chemical and solvent resistance over phosphate treated surfaces (B1000). Furthermore, performance characteristics of the waterborne coatings of the present invention are approximately equal to the performance characteristics of organic solvent borne coatings over textured surfaces.

While only a few, preferred embodiments of the invention have been described, those of ordinary skill in the art will recognize that the embodiment may be modified and altered without departing from the central spirit and scope of the invention. Thus, the preferred embodiments described above are to be considered in all respects as illustrative and not restrictive, the scope of the invention being indicated by the following claims, rather than by the foregoing description, and all changes which come within the meaning and range of equivalents of the claims are intended to be embraced.

What is claimed is:

1. A coating composition, comprising:

(a) polymeric particles comprising at least one incorporated monoalkenyl aromatic monomer; at least one incorporated vinyl-containing surfactant macromonomer having the structure:

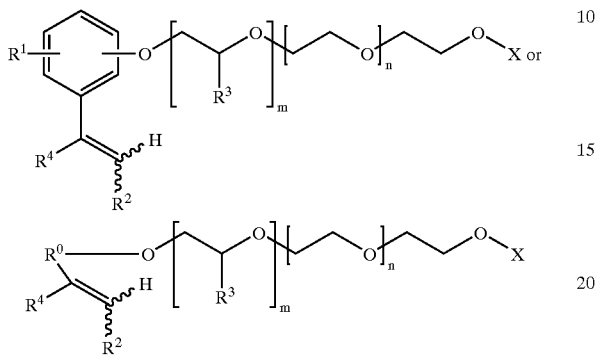

wherein $R^0$ is an organic di-radical, $R^1$ is H, a halogen, or a $C_1$ to $C_{22}$ linear or branched chain hydrocarbon group; $R^2$ is H, a halogen, or a linear or branched chain $C_1$ to $C_6$ linear or branched chain hydrocarbon; $R^3$ is H, a halogen, or a $C_1$ to $C_6$ linear or branched chain hydrocarbon group; $R^4$ is H or a $C_1$ to $C_4$ alkyl group; m is an integer ranging from 0 to 20; n is an integer ranging from 1 to 50; X is H, $SO_3^-Y$, $P(=O)(OH)_2$, or a deprotonated form of $P(=O)(OH)_2$; and Y is a cation selected from the group consisting of sodium, lithium, potassium, ammonium, monoalkylammonium, dialkylammonium, trialkylammonium, tetralkylammonium, and combinations thereof at least one incorporated acrylic monomer, wherein at least one incorporated acrylic monomer comprises at least one functional group, the functional group selected from the set consisting of a hydroxyl functional group, an amine functional group, and a carboxylic acid functional group; and incorporated 2-ethylhexyl acrylate;

(b) a crosslinking agent comprising an organic compound having at least one isocyanate group, at least one block isocyanate group, or at least one isocyanate group and at least one blocked isocyanate group; and (c) water.

2. A coating composition, comprising:

(a) polymeric particles comprising at least one incorporated monoalkenyl aromatic monomer, at least one incorporated vinyl-containing surfactant macromonomer having the structure:

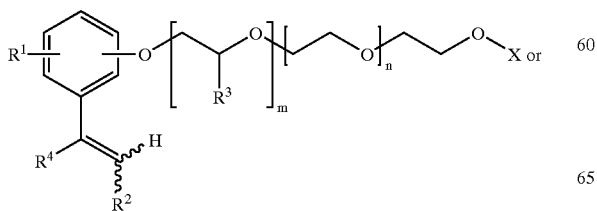

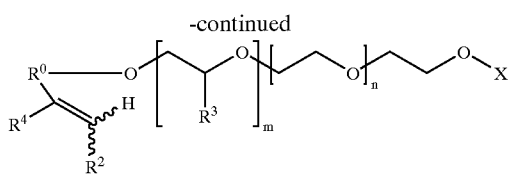

wherein $R^0$ an organic di-radical, $R^1$ is H, a halogen, or a $C_1$ to $C_{22}$ linear or branched chain hydrocarbon group; $R^2$ is H, a halogen, or a linear or branched chain $C_1$ to $C_6$ linear or branched chain hydrocarbon; $R^3$ is H, a halogen, or a $C_1$ to $C_6$ linear or branched chain hydrocarbon group; $R^4$ is H or a $C_1$ to $C_4$ alkyl group; m is an integer ranging from 0 to 20; n is an integer ranging from 1 to 50; X is H, $SO_3^-Y$, $P(=O)(OH)_2$, or a deprotonated form of $P(=O)(OH)_2$; and Y is a cation selected from the group consisting of sodium, lithium, potassium, ammonium, monoalkylammonium, dialkylammonium, trialkylammonium, tetralkylammonium, and combinations thereof, and incorporated styrene, incorporated 2-ethylhexyl acrylate, incorporated 2-hydroxyethyl acrylate, and incorporated methacrylic acid;

(b) a crosslinking agent comprising an organic compound having at least one isocyanate group, at least one block isocyanate group, or at least one isocyanate group and at least one blocked isocyanate group; and (c) water.

3. A coating composition, comprising:

(a) polymeric particles comprising at least one incorporated monoalkenyl aromatic monomer, at least one incorporated vinyl-containing surfactant macromonomer having the structure:

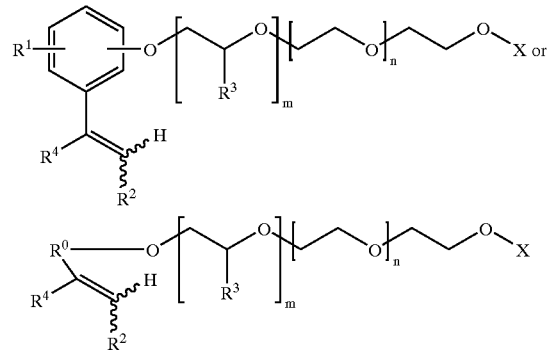

wherein $R^0$ an organic di-radical, $R^1$ is H, a halogen, or a $C_1$ to $C_{22}$ linear or branched chain hydrocarbon group; $R^2$ is methyl or H; $R^3$ is H; $R^4$ is H; m is 0; n is an integer ranging from 5 to 25; X is $SO_3^-Y$; and Y is a cation selected from the group consisting of sodium, lithium, potassium, ammonium, monoalkylammonium, dialkylammonium, trialkylammonium, tetralkylammonium, and combinations thereof, and at least one incorporated acrylic monomer, wherein at least one incorporated acrylic monomer comprises at least one functional group, the functional group selected from the set consisting of a hydroxyl functional group, an amine functional group, and a carboxylic acid functional group;

(b) a crosslinking agent comprising an organic compound having at least one isocyanate group, at least one block isocyanate group, or at least one isocyanate group and at least one blocked isocyanate group; and (c) water.

4. The coating composition according to claim 3, wherein n is 19, m is 0, and Y is selected from the group consisting of ammonium, monoalkylammonium, dialkylammonium, trialkylammonium, and tetraalkylammonium cations.

5. A method of preparing a coating composition, comprising:

mixing polymeric particles with a crosslinking agent to produce the coating composition, wherein the polymeric particles comprise at least one incorporated monoalkenyl aromatic monomer, at least one incorporated vinyl-containing surfactant macromonomer having the structure:

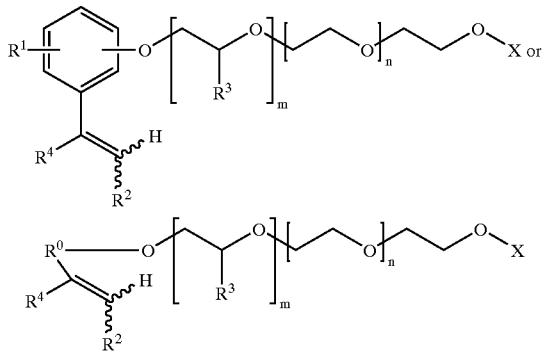

wherein $R^0$ is an organic di-radical, $R^1$ is H, a halogen, or a $C_1$ to $C_{22}$ linear or branched chain hydrocarbon group; $R^2$ is methyl or H; $R^3$ is H; $R^4$ is H; m is 0; n is an integer ranging from 5 to 25; X is $SO_3^-Y$; and Y is a cation selected from the group consisting of sodium, lithium, potassium, ammonium, monoalkylammonium, dialkylammonium, trialkylammonium, tetralkylammonium, and combinations thereof, and at least one incorporated acrylic monomer, wherein at least one incorporated acrylic monomer comprises a functional group selected from the set consisting of a hydroxyl functional group, an amine functional group, and a carboxylic acid functional group and wherein the crosslinking agent comprises an organic compound having at least one isocyanate group, at least one blocked isocyanate group, or at least one isocyanate group and at least one blocked isocyanate group.

6. The method of preparing a coating composition according to claim 5, wherein n is 19 and Y is selected from the group consisting of ammonium, monoalkylammonium, dialkylammonium, trialkylammonium, and tetraalkylammonium cations.

* * * * *